US012085466B2

United States Patent
Hügel

(10) Patent No.: US 12,085,466 B2
(45) Date of Patent: Sep. 10, 2024

(54) PRESSURE GAUGE FOR MEASURING A PRESSURE

(71) Applicant: Endress+Hauser SE+Co. KG, Maulburg (DE)

(72) Inventor: Michael Hügel, Offenburg (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 0 days.

(21) Appl. No.: 17/754,565

(22) PCT Filed: Sep. 24, 2020

(86) PCT No.: PCT/EP2020/076666
§ 371 (c)(1),
(2) Date: Apr. 6, 2022

(87) PCT Pub. No.: WO2021/069218
PCT Pub. Date: Apr. 15, 2021

(65) Prior Publication Data
US 2024/0060841 A1    Feb. 22, 2024

(30) Foreign Application Priority Data

Oct. 10, 2019   (DE) .......................... 102019127315.3
Aug. 21, 2020   (DE) .......................... 102020121981.4

(51) Int. Cl.
*G01L 19/06*   (2006.01)

(52) U.S. Cl.
CPC ................................ *G01L 19/0672* (2013.01)

(58) Field of Classification Search
CPC ................................................ G01L 19/0672
(Continued)

(56) References Cited

U.S. PATENT DOCUMENTS 4,770,207 A  *  9/1988  Hofmann ............ G01L 19/0015
                                                                137/557
6,539,777 B1    4/2003  Ashworth et al.
(Continued)

FOREIGN PATENT DOCUMENTS

CN   102939520 A    2/2013
CN   204373838 U    6/2015
(Continued)

*Primary Examiner* — Marrit Eyassu
(74) *Attorney, Agent, or Firm* — Christopher R. Powers; Endress+Hauser (USA) Holding, Inc.

(57) ABSTRACT

A pressure gauge for measuring a pressure includes: a pressure measuring cell; a rotationally symmetric sensor bushing configured to accept the pressure measuring cell; a rotationally symmetrical process connection for releasably attaching the pressure gauge to a measuring point; a process seal to prevent the process medium entering the pressure gauge; the process connection and/or the sensor bushing having multiple individual recesses configured such that the individual recesses together form a fluidic path group of multiple fluidic individual paths extending parallel to one another, by means of which, in the event that the process seal fails, the process medium is conducted from a sealing plane for the process seal to at least one opening visible from the outside when the pressure gauge is in an installed state, the individual recesses configured such that a total cross-sectional area of the recesses forming the path group has a predefined minimal cross-sectional area.

11 Claims, 3 Drawing Sheets

(58) Field of Classification Search
USPC .......................................................... 73/700
See application file for complete search history.

(56) References Cited

U.S. PATENT DOCUMENTS

| | | | |
|---|---|---|---|
| 11,408,789 B2* | 8/2022 | Rech | .................... G01L 19/0023 |
| 2004/0200289 A1 | 10/2004 | Sherman et al. | |
| 2013/0086990 A1* | 4/2013 | Hugel | ........................ G01L 1/04 |
| | | | 73/774 |
| 2018/0180505 A1 | 6/2018 | Zipp et al. | |
| 2019/0078956 A1 | 3/2019 | Knoll et al. | |
| 2023/0314253 A1* | 10/2023 | Ponath | .................. G01D 11/245 |
| | | | 73/753 |

FOREIGN PATENT DOCUMENTS

| | | |
|---|---|---|
| CN | 105393045 A | 3/2016 |
| CN | 106062526 A | 10/2016 |
| CN | 107430040 A | 12/2017 |
| CN | 108240885 A | 7/2018 |
| CN | 109923381 A | 6/2019 |
| DE | 10131855 A1 | 1/2003 |
| DE | 10255279 A1 | 6/2004 |
| DE | 102006043499 A1 | 3/2008 |
| DE | 102016015447 A1 | 3/2017 |
| DE | 102016204511 B3 | 3/2017 |
| JP | 2004286536 A | 10/2004 |
| WO | 03004984 A1 | 1/2003 |
| WO | 2004048915 A1 | 6/2004 |
| WO | 2018099666 A1 | 6/2018 |

* cited by examiner

PRESSURE GAUGE FOR MEASURING A PRESSURE

CROSS-REFERENCE TO RELATED APPLICATIONS

The present application is related to and claims the priority benefit of German Patent Application Nos. 102019127315.3, filed on Oct. 10, 2019, and 102020121981.4, filed on Aug. 21, 2020, and International Patent Application No. PCT/EP2020/076666 filed Sep. 24, 2020, the entire contents of which are incorporated herein by reference.

TECHNICAL FIELD

The invention relates to a pressure gauge for measuring a pressure.

BACKGROUND

In automation technology, pressure gauges are frequently used which serve to monitor a process medium. Such pressure gauges usually consist of a process connection which serves to secure the pressure gauge to a measuring point in an automation system. A pressure measuring cell is inserted into the process connection flush to the front, i.e., towards the process, which pressure measuring cell is sealed from the process by a process seal so that no process medium can escape from or enter the housing of the pressure gauge.

In hygienic applications, i.e., processes in which there is a high requirement for purity, e.g., in the food industry, in pharmaceuticals, or in biochemistry as well, the corresponding certification bodies, e.g., 3-A or the European Hygienic Equipment Design Group (also referred to below as EHEDG for short) prescribe that leaky process seals be detected.

One possibility for detecting such a leaky process seal is the use of electronic means, e.g., a sensor in the form of an electronic nose, which detects the entry of the process medium into a housing of the pressure gauge. Such an approach is described in DE 102 55 279 A1, for example.

One disadvantage of this is that, for one thing, the sensor has to be integrated into the pressure gauge, and corresponding electronics for controlling the sensor are additionally required.

SUMMARY

It is, therefore, an aim of the invention to propose a simpler option for monitoring a process seal for leaks.

The aim is achieved according to the invention by the pressure gauge according to the present disclosure.

The pressure gauge according to the invention for measuring a pressure comprises:
- a pressure measuring cell;
- a rotationally symmetric sensor bushing into which the pressure measuring cell is inserted;
- a rotationally symmetric process connection for releasably fastening the pressure gauge to a wall of a measuring point, wherein the process connection at one end has an inwardly extending, circumferential stop surface and an opening for receiving the sensor bushing at another end, wherein the sensor bushing with the pressure measuring cell in an installed state is inserted through the opening into the process connection up to the stop surface so that the pressure measuring cell is introduced into the measuring point so as to be substantially flush to the front.
- a process seal which seals in a sealing plane between the sensor bushing and the stop surface of the process connection, in order to, in this way, prevent the process medium from penetrating the pressure gauge;
wherein the process connection and/or the sensor bushing has or have multiple individual recesses, which are designed such that the individual recesses together form a fluidic path group consisting of multiple, fluidic, individual paths running parallel to one another, by means of which path group, in the event that the process seal fails, the process medium is guided from the sealing plane for the process seal to at least one opening that is visible from the outside when the pressure gauge is in the installed state, wherein the individual recesses are designed such that a total cross-sectional area of the cross-section of the recesses forming the multiple, fluidic, individual paths running parallel to one another corresponds to a predetermined, minimal cross-sectional area.

A pressure gauge is disclosed, with which it is possible to detect leaks in the process seal in that the process medium is guided via a fluidic path group from the point of entry or leakage to an opening that can be easily discerned from outside by an operator/service technician, so that a leaking of the process seal is signaled by the leaking of the process medium from the opening. According to the invention, the fluidic path group comprises not only a single path through which the process medium is guided, but multiple individual paths running parallel to one another, via which the process medium is guided from the leaky process seal to the opening.

An advantageous embodiment of the pressure gauge provides that the sensor bushing on a front face and/or the process connection on a stop surface, which extends radially inwards and which is conceived for the sensor bushing, have multiple horizontal recesses, wherein the multiple horizontal recesses are designed such that the total cross-sectional area of the individual cross-sections of the multiple horizontal recesses corresponds to the predefined, minimal cross-section.

A further advantageous embodiment of the pressure gauge provides that an outer lateral surface of the sensor bushing in a lower sub-region, which, in the installed state, adjoins an inner lateral surface of the process connection, and/or an inner lateral surface of the process connection in a lower sub-region, which, in the installed state, adjoins a or the outer lateral surface of the lower sub-region of the sensor bushing, have multiple vertical recesses, wherein the multiple vertical recesses are designed such that the total cross-sectional area of the individual cross-sections of the multiple vertical recesses corresponds to the predefined, minimal cross-section.

A further advantageous embodiment of the pressure gauge provides that the sensor bushing in the lower sub-region and/or the process connection in the lower sub-region have at least one circumferential collecting groove for collecting the process medium, which is in particular fed via the horizontal recesses, wherein the at least one collecting groove is designed such that a cross-section of the collecting groove corresponds to the predefined, minimal cross-section.

A further advantageous embodiment of the pressure gauge provides that the sensor bushing have a circumferential shoulder ring up to which the sensor bushing in the installed state is inserted into the opening of the process connection, and wherein the sensor bushing has a further circumferential collecting groove, which preferably directly adjoins the shoulder ring and is designed to guide the process medium to the at least one opening that is visible from the outside, wherein the further collecting groove is designed such that a cross-section of the further collecting groove corresponds to the predefined, minimal cross-section.

A further advantageous embodiment of the pressure gauge provides that the at least one opening that is visible from the outside be designed such that a cross-section or a total cross-sectional area corresponds to the predefined, minimal cross-section. In particular, the embodiment can provide that the at least one opening that is visible from the outside be formed on a rear side of the process connection on which the shoulder ring of the sensor bushing rests in the installed state.

A further advantageous embodiment of the pressure gauge provides that the predefined, minimal cross-section correspond to a specification of a standard, in particular a standard relating to hygiene, of the European Hygienic Equipment Design Group and/or 3-A, in particular Standard 74-07 of 3-A, published in March 2019

A further advantageous embodiment of the pressure gauge provides that the predefined, minimal cross-section be at least 4.9 square millimeters ($mm^2$), preferably at least 5 $mm^2$, and particularly preferably at least 7.2 $mm^2$.

BRIEF DESCRIPTION OF THE DRAWINGS

The invention is explained in more detail based upon the following drawings. The following are shown.

DETAILED DESCRIPTION

Figure 1:
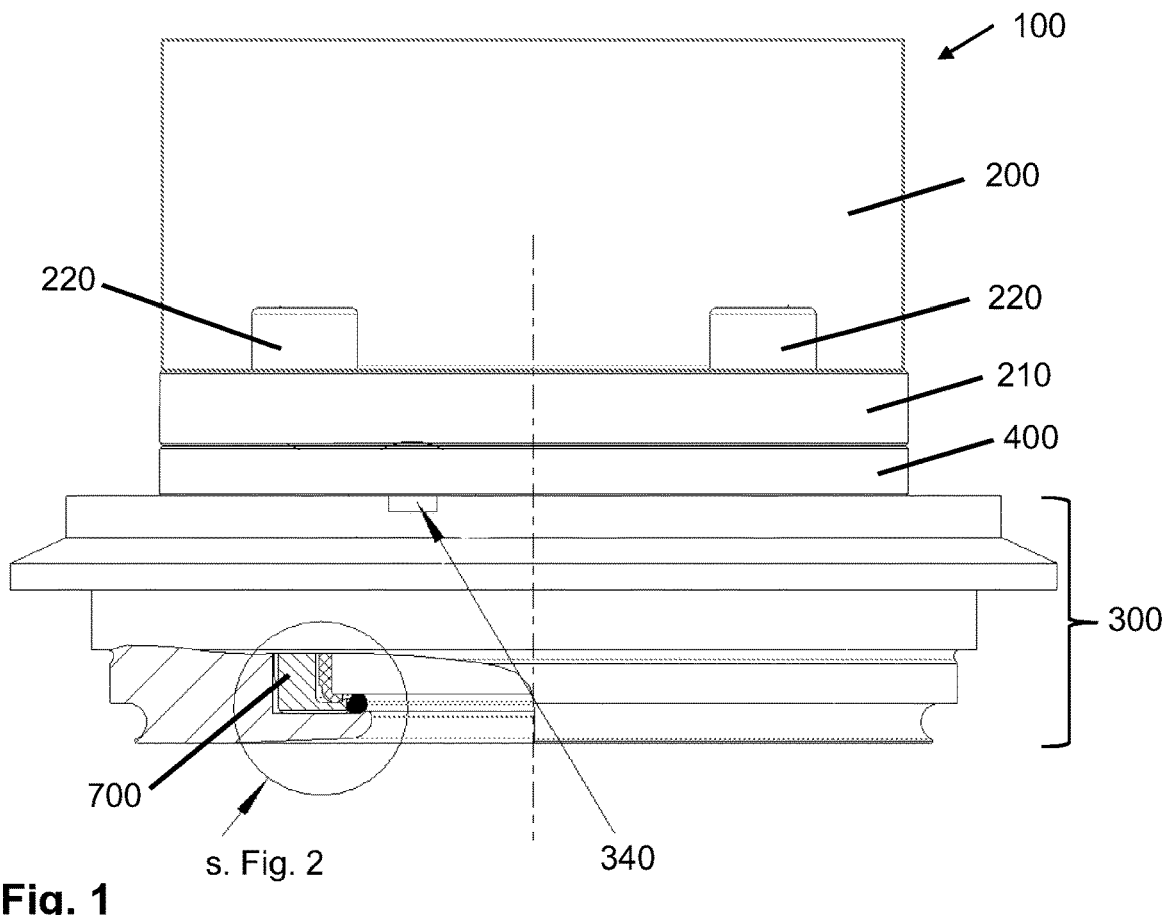
FIG. 1 shows a partial cross-section through a pressure gauge designed according to the invention present disclosure.

FIG. 1 shows a partial section through a pressure gauge 100 designed according to the invention. The pressure gauge 100 shown in FIG. 1 comprises multiple main elements, a rotationally symmetric sensor bushing 400, a pressure measuring cell 500 inserted into the sensor bushing 400 flush to the front, a likewise rotationally symmetric process connection 300 for attaching the pressure gauge 100 to a wall of a container or tube containing a process medium, a process seal 600 for sealing the pressure measuring cell 500, used on the front side, from the process, and a housing 200 fastened via a housing adapter 210.

The rotationally symmetric sensor bushing 400 has a substantially hollow cylindrical body with an outer circumferential shoulder ring 420, a lower part 430 that is adjacent to the shoulder ring 420 and can be inserted into the process connection 300, and an upper part 410 adjoining the shoulder ring 420. The lower part 430 of the sensor bushing 400 is designed such that the sensor bushing can be introduced via said lower part into a corresponding opening 330 of the process connection 300. The shoulder ring 420 has multiple, preferably concentric, bores 421, through which the housing 200 can be connected to the process connection 300 by means of screws 220. The sensor bushing 400 further has, at an end opposite the housing 200, an inwardly extending, radially circumferential stop surface 433. The pressure measuring cell 500 is introduced into the sensor bushing 400 flush to the front via the stop surface 433 and can be positioned with the aid of an additional, rotationally symmetric centering ring 700.

The centering ring 700 has a substantially rotationally symmetric, L-shaped cross-section with a short and a long leg piece 710 and 720. The stop surface 433 and the centering ring 700 are matched to one another in such a way that the centering ring 700 rests on the stop surface 433 with the short leg piece 710. Furthermore, the centering ring 700 is designed such that the long leg piece 720 surrounds the pressure measuring cell 500 so as to be substantially flush externally, so that the pressure measuring cell 500 is aligned centrally in the sensor bushing 400.

The pressure measuring cell 500 used is preferably a ceramic pressure measuring cell having a preferably ceramic base body 510 and a pressure-sensitive, preferably ceramic, measuring membrane 520, which moves out of its rest position as a function of a pressure acting on it. The measuring membrane 520 and the base body 510 are joined to one another by means of a joint 530 in a pressure-tight manner at their edge to form a measuring chamber.

In order to detect the pressure-dependent deflection and to convert the pressure-dependent deflection into an electrical signal, the pressure measuring cell has one or more transducer elements. All transducer elements known from the prior art can be considered transducer elements. However, the transducer elements are preferably capacitive transducer elements. Capacitive transducer elements usually have at least one electrode arranged on an inner side of the measuring membrane and at least one counter-electrode arranged on an outer side of the base body opposite the inner side and facing the measuring membrane.

The rotationally symmetric process connection 300 has, in turn, at an end (front side) 370 that is directed in the installed state towards the process, an inwardly extending, radially circumferential stop surface 310, up to which the sensor bushing 400 with the pressure measuring cell 500 is introduced into the process connection 300. In this case, the pressure measuring cell 500 is introduced into the sensor bushing 400 in such a way that the pressure-sensitive measuring membrane 520 in the installed state is directed towards the process (flush to the front).

Figure 2:
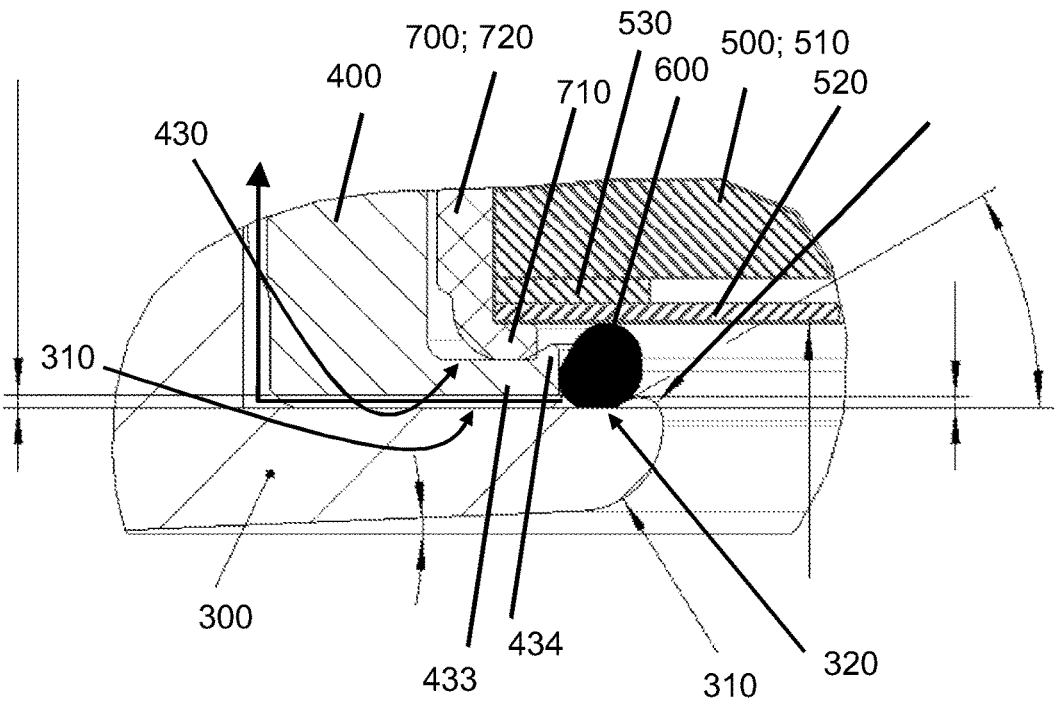
FIG. 2 shows a detailed, cross-sectional view of a region of the pressure gauge in which the pressure gauge is sealed by means of a process seal from the process medium.
Figure 3:
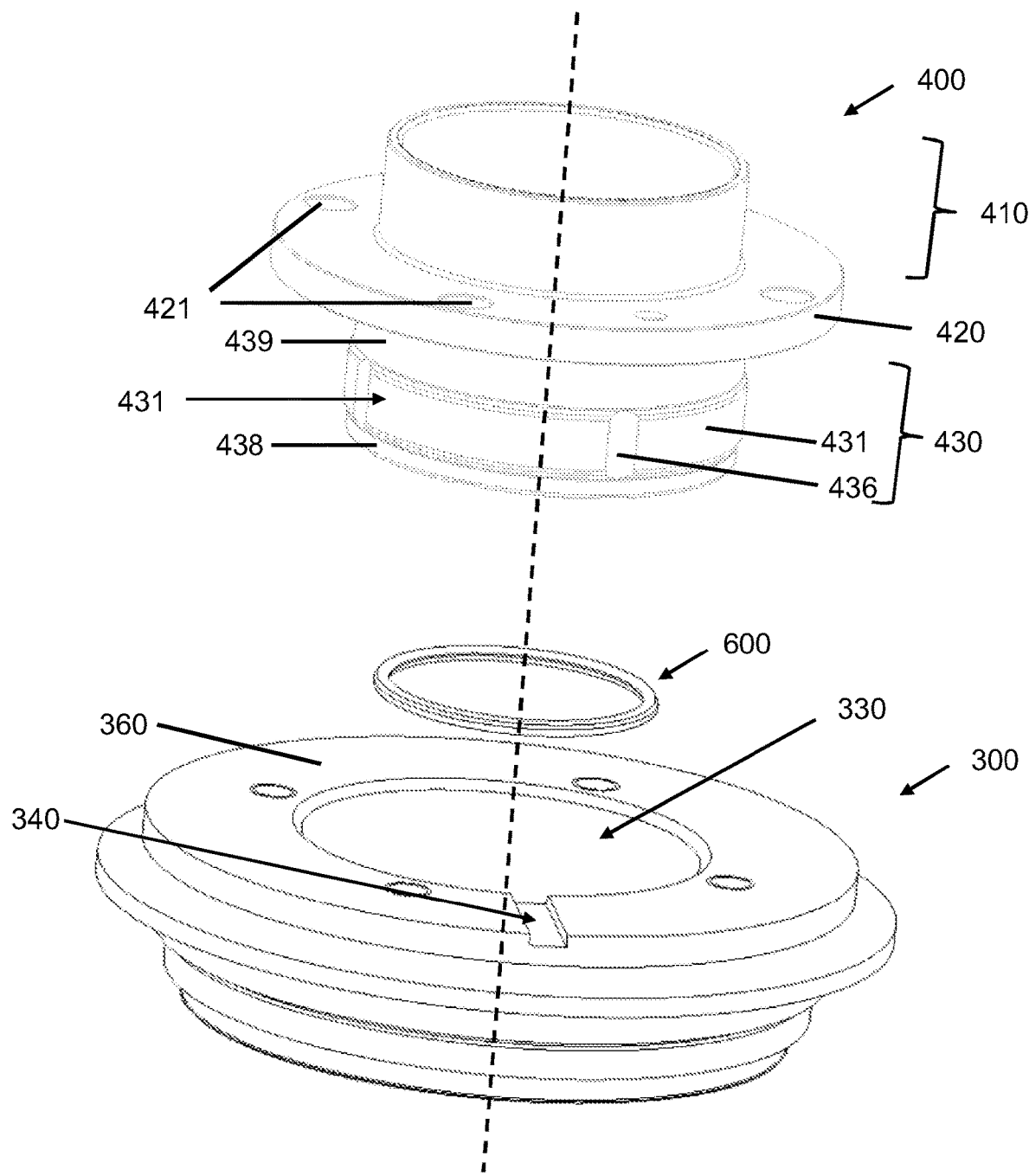
FIG. 3 shows an exploded view of a sensor bushing, of the process seal, and of a process connection via which the pressure gauge is attached at a measuring point.

As shown in FIG. 2, a radially circumferential process seal 600 is introduced between the pressure measuring cell 500 and the process connection 300 to prevent the process medium from penetrating between the process connection and the sensor bushing. The process seal 600 can be designed, for example, in the form of an O-ring and consist of a material which is resistant to the process medium. For example, the process seal may comprise ethylene-propylene-diene rubbers (EPDM), fluororubber (FKM), perfluoro rubber (FFKM), nitrile rubber (NBR), or fluoroprene.

In order to prevent the process seal 600 from slipping, the stop surface of the process connection 310 can be designed such that the stop surface 310 extends further inwards beyond the stop surface of the sensor bushing 433 for the centering ring and, in this region, has a depression 320 for receiving the process seal 600. Furthermore, in order to reduce creepage of the process seal, a nose 434 can be provided on the inner end of the stop surface of the sensor bushing.

Figure 4:
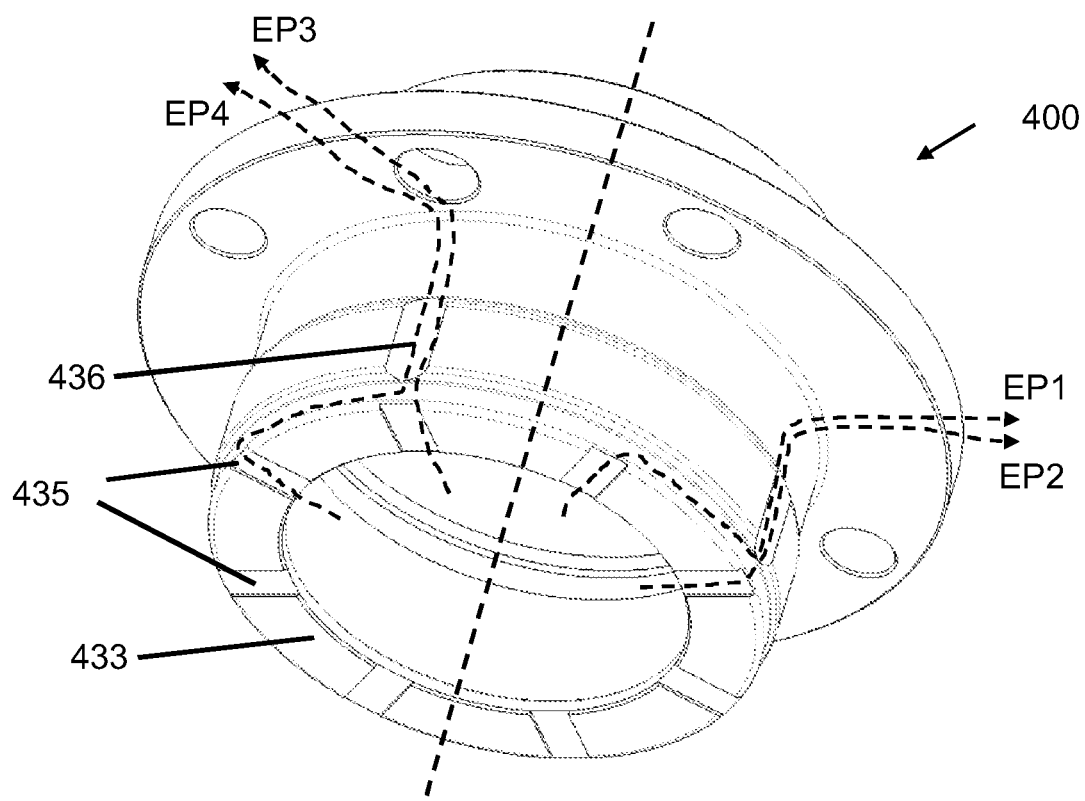
FIG. 4 shows a perspective view of an embodiment of the sensor bushing.

In order to be able to detect a failure of the process seal 600, a front face of the sensor bushing directed towards the stop surface of the process connection in the installed state has multiple recesses or slots. By way of example, FIG. 4 shows a perspective view of a correspondingly configured sensor bushing. In the exemplary embodiment shown in FIG. 4, the sensor bushing has eight recesses (horizontal recesses) 435 on the front face that extend radially outwards, via which the process medium is guided in the event that the process seal 600 fails.

In addition or as an alternative to the horizontal recesses 435 on the front face of the sensor bushing, multiple horizontal recesses can also be introduced into the stop surface 310 for the sensor bushing of the process connection 300.

The process medium is guided through the horizontal recesses 435 to an outer lateral surface 431 of the lower part 430 of the sensor bushing 400. The lower part 430 of the sensor bushing 400 can have a circumferential, lower collecting groove 438, adjoining the front face, in which the supplied process medium is collected.

In order to guide the process medium from the lower collecting groove 438 further to an opening that is clearly visible from the outside, the outer lateral surface 431 of the lower part 430 of the sensor bushing 400 may have multiple vertical recesses 436. In addition, the lower part 430 of the sensor bushing 400 may have an upper collecting groove 439, directly adjoining the shoulder ring, into which the vertical recesses 436 open. The vertical recesses 436 are thus designed such that, in the installed state, a fluidic connection arises between the lower and the upper collecting grooves 438, 439, via which the process medium is guided.

As an alternative to or in addition to the vertical recesses 436 integrated into the outer lateral surface 431 of the lower part 430 of the sensor bushing 400, an inner lateral surface 380 of the process connection 300, which, in the installed state, adjoins the outer lateral surface 431 of the lower part 430 of the sensor bushing 400, may have multiple vertical recesses. This can be useful, for example, if, due to its configuration, the sensor bushing does not have sufficient material in the wall area to be able to realize corresponding vertical recesses.

The horizontal and/or vertical recesses 435, 350, 436 may have been introduced at the corresponding location, e.g., by milling. Furthermore, the recesses 435, 350, 436 may also be designed in the form of slots.

Figure 5:
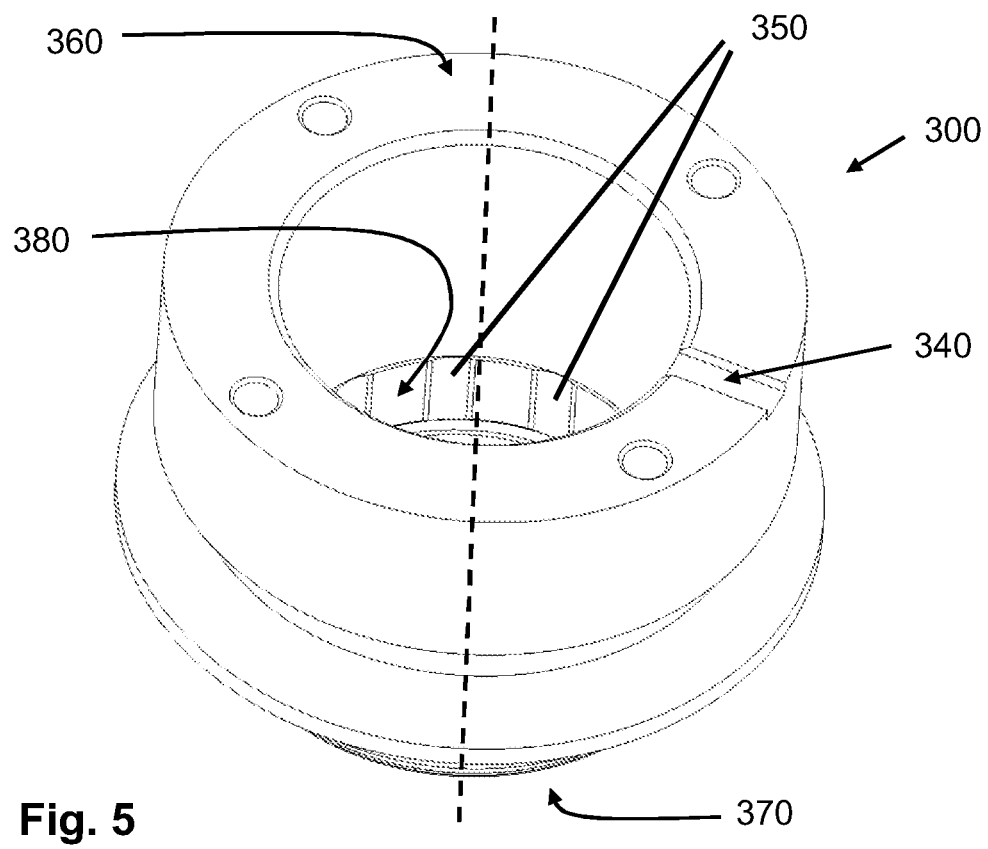
FIG. 5 shows a perspective view of an embodiment of the process connection.

By means of the horizontal and/or vertical recesses 435, 350, 436, in combination with the collecting groove or the collecting grooves 438, 439, a fluidic path group consisting of multiple, fluidic, individual paths EP1, EP2, EP3, and EP4 going to the opening 340 is formed, via which a process medium, which penetrates due to a defective process seal 600, is guided from a sealing plane, in which the process seal 600 forms a pressure-tight connection between the stop surface of the process connection and the sensor bushing resting on the stop surface with the front face, to the opening 340 that is clearly visible from the outside. As shown in FIG. 5, the opening 340 may be formed on a rear side 360, facing away from the front face, of the process connection. Furthermore, multiple openings may also be provided instead of a single opening 340.

To illustrate the fluidic individual paths EP1-EP4, four individual paths are shown by dashed arrows in FIG. 4 by way of example. Each individual path thus comprises a horizontal recess 435, which opens into the lower collecting groove 438 adjoining the front face of the sensor bushing 400, a vertical recess 436 which opens the lower collecting groove 438 with an upper collecting groove 439 adjoining the shoulder ring, and the upper collecting groove 439 adjoining the shoulder ring. According to the invention, the recesses 435, 350, 436 are designed such that a total cross-sectional area of the cross-section of the recesses forming the multiple, fluidic, individual paths running parallel to one another corresponds to a predefined, minimal cross-section. The predefined, minimal cross-section corresponds to a specification from a standard, in particular a standard (hygiene standard) of the European Hygienic Equipment Design Group (EHEDG) and/or 3-A. In particular, the predefined, minimal cross-section corresponds to Standard 74-07, published in March 2019. For example, the predefined, minimal cross-section can be at least 4.9 square millimeters ($mm^2$), preferably at least 5 square millimeters ($mm^2$), and particularly preferably at least 7.2 square millimeters ($mm^2$).

The invention claimed is:

1. A pressure gauge for measuring a pressure of a process medium at a measuring point, the pressure gauge comprising:
    a pressure measuring cell including a pressure-sensitive measuring membrane;
    a rotationally_symmetric sensor bushing in which the pressure measuring cell is disposed;
    a rotationally_symmetric process connection configured to enable releasably attaching the pressure gauge to a wall of the measuring point, wherein the process connection includes:
        at an end, an inwardly_extending, circumferential stop surface configured to complement the sensor bushing and upon which the sensor bushing seats in an installed state; and
        at another end, an aperture configured to receive the sensor bushing, wherein in the installed state the sensor bushing with the pressure measuring cell is introduced through the aperture into the process connection to the stop surface such that the pressure measuring cell is introduced into the measuring point such that the pressure-sensitive measuring membrane is directed toward the process medium; and
    a process seal configured to seal in a sealing plane between the sensor bushing and the stop surface of the process connection as to prevent the process medium from penetrating the pressure gauge,
    wherein the process connection and/or the sensor bushing include a plurality of individual recesses, each configured such that the plurality of individual recesses collectively define a fluidic path group comprising multiple, fluidically parallel paths, by which path group, when the process seal leaks, the process medium is guided from the sealing plane of the process seal to at least one opening that is visible from an exterior of the pressure gauge when the pressure gauge is in the installed state,
    wherein each of the plurality of individual recesses has a cross-sectional area such that a combined, total area of the cross-sectional areas of the plurality of individual recesses defining the path group has a predefined, minimal cross-sectional area.

2. The pressure gauge of claim 1, wherein the sensor bushing on a front face and/or the process connection on the stop surface includes multiple horizontal recesses of the plurality of individual recesses, wherein each of the horizontal recesses has a cross-sectional area configured such that a combined, total area of the individual cross-sectional areas of the horizontal recesses corresponds to the predefined, minimal cross-sectional area.

3. The pressure gauge of claim 1, wherein an outer lateral surface of the sensor bushing in a lower sub-region thereof, which in the installed state adjoins an inner lateral surface of the process connection, and/or the inner lateral surface of the process connection in a lower sub-region thereof, which in the installed state adjoins the outer lateral surface of the lower sub-region of the sensor bushing, includes multiple vertical recesses of the plurality of individual recesses, wherein each of the vertical recesses has a cross-sectional area configured such that a combined, total cross-sectional area of the individual cross-sections of the vertical recesses corresponds to the predefined, minimal cross-sectional area.

4. The pressure gauge of claim 2, wherein the sensor bushing in a lower sub-region thereof and/or the process connection in a lower sub-region thereof includes at least one circumferential collecting groove configured to collect the process medium, which at least one collecting groove is fed via the multiple horizontal recesses, wherein the at least one collecting groove is configured such that a cross-sectional area of the at least one collecting groove corresponds to the predefined, minimal cross-sectional area.

5. The pressure gauge of claim 1, wherein the sensor bushing includes a circumferential shoulder ring to which the sensor bushing is introduced into the aperture of the process connection in the installed state, and wherein the sensor bushing includes a circumferential further collecting groove, which directly adjoins the shoulder ring and is configured to guide the process medium to the at least one opening that is visible from the exterior, wherein the further collecting groove is configured such that a cross-sectional area of the further collecting groove corresponds to the predefined, minimal cross-sectional area.

6. The pressure gauge of claim 5, wherein the at least one opening that is visible from the exterior is on a rear side of the process connection on which the shoulder ring of the sensor bushing rests in the installed state.

7. The pressure gauge of claim 1, wherein the at least one opening that is visible from the exterior is configured such that a cross-section or a total cross-sectional area corresponds to the predefined, minimal cross-sectional area.

8. The pressure gauge of claim 1, wherein the predefined, minimal cross-sectional area corresponds to a specification of a standard relating to hygiene of the European Hygienic Equipment Design Group and/or 3-A.

9. The pressure gauge of claim 8, wherein the predefined, minimal cross-sectional area corresponds to a specification of Standard 74-07 of 3-A, published March 2019.

10. The pressure gauge of claim 1, wherein the predefined, minimal cross-sectional area is at least 4.0 square millimeters ($mm^2$).

11. The pressure gauge of claim 1, wherein the predefined, minimal cross-sectional area is at least 4.9 $mm^2$.

* * * * *